Figure 1:
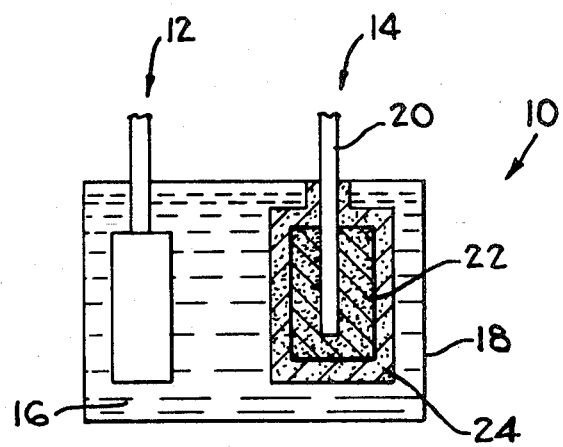

United States Patent [19]

Coetzer

[11] 4,287,268

[45] * Sep. 1, 1981

[54] ELECTRODE FOR AN ELECTROCHEMICAL CELL, AND AN ELECTROCHEMICAL CELL

[75] Inventor: Johan Coetzer, Pretoria, South Africa

[73] Assignee: The South African Inventions Development Corporation, Pretoria, South Africa

[*] Notice: The portion of the term of this patent subsequent to Aug. 14, 1997, has been disclaimed.

[21] Appl. No.: 58,145

[22] Filed: Jul. 17, 1979

[30] Foreign Application Priority Data

Jul. 17, 1978 [ZA] South Africa ..................... 78/4059
Jul. 17, 1978 [ZA] South Africa ..................... 78/4060
Sep. 6, 1978 [ZA] South Africa ..................... 78/5064

[51] Int. Cl.$^3$ ........................................ H01M 10/39
[52] U.S. Cl. ................................ 429/103; 429/112; 429/199; 429/218
[58] Field of Search .............. 429/103, 199, 218, 233, 429/236, 245, 191, 192, 193, 112; 423/328, 332; 252/500, 512

[56] References Cited

U.S. PATENT DOCUMENTS

| | | | |
|---|---|---|---|
| 2,933,547 | 4/1960 | Grubb, Jr. ..................... | 429/192 X |
| 3,186,875 | 6/1965 | Freeman, Jr. .................. | 429/191 |
| 3,236,693 | 2/1966 | Caesar .......................... | 429/19 |
| 3,513,027 | 5/1970 | Liang et al. .................. | 429/191 |
| 3,531,324 | 9/1970 | Fischer et al. ................ | 429/103 |
| 3,716,409 | 2/1973 | Cairns et al. ................. | 429/103 |
| 3,736,186 | 5/1973 | Liang ............................ | 429/191 |
| 3,751,298 | 8/1973 | Senderoff ..................... | 429/199 X |
| 3,864,168 | 2/1975 | Casey, Jr. et al. ............ | 429/194 |
| 3,929,504 | 12/1975 | Gore et al. .................... | 429/199 X |
| 3,966,491 | 6/1976 | Mananter et al. ............ | 429/103 |
| 4,009,052 | 2/1977 | Whittingham ................ | 429/191 |
| 4,012,562 | 3/1977 | Saunders ...................... | 429/103 |
| 4,057,678 | 11/1977 | Walker, Jr. .................. | 429/104 |
| 4,076,905 | 2/1978 | Sammells ..................... | 429/112 |
| 4,136,233 | 1/1979 | Eisenberg ..................... | 429/191 |
| 4,164,608 | 8/1979 | Coetzer ........................ | 429/218 X |

OTHER PUBLICATIONS

K. Steff, "The Crystal Structure of a Sulfur Sorption Complex of Zedite 4A", J. Phys. Chem. 76, 2601 (1972).
R. M. Barrer and J. F. Cole, "Interaction of Sodium Vapour with Synthetic Sodalite: Sorption and Formation of Colour Center", J. Phys. Chem. Solids, 29, 1755 (1968).

*Primary Examiner*—Anthony Skapars
*Attorney, Agent, or Firm*—Arnold, White & Durkee

[57] ABSTRACT

An electrode for an electrochemical cell, the electrode comprising an electrochemically active substance selected from:

(a) the group comprising or including the halogens, the alkali metals, the alkaline earth metals the first and second series of transition elements, lead, phosphorus, arsenic, antimony, bismuth, and aluminium;
(b) an oxygen, sulphur or selenium composition; or
(c) a composition containing carbon, baron, silicon or nitrogen with any of the substances of (a) or (b);

and a zeolite molecular sieve carrier wherein the electrochemically active substance is sorbed and is held in dispersed form for effective use in a cell. An electrochemical cell including a pair of electrodes and an electrolyte, at least one electrode comprising an electrode as defined above.

35 Claims, 2 Drawing Figures

ELECTRODE FOR AN ELECTROCHEMICAL CELL, AND AN ELECTROCHEMICAL CELL

This invention relates to an electrode for an electrochemical cell, and to an electrochemical cell.

In recent times increasing attention has been given to the development of energy storage mechanisms.

These developments have, however, been retarded to varying degrees by the difficulties involved in effectively immobilising, separating and controlling mobile electrochemically active substances.

Proposals to overcome the difficulties involved in effectively separating mobile electrochemically active substances by using solid electrolytes to function as electrode separators, or by using electrochemically active substance compounds to immobilise active species, have not been entirely successful.

In this specification by an 'electrochemically active substance as defined' is meant an electrochemically active element, alloy, substance, composition, or mixture which is capable of reacting electrochemically when coupled with a compatible electrode in the presence of a compatible electrolyte in a cell, and which:

(a) consists in one or more elements selected from the group consisting of the halogens, the alkali metals, the alkaline earth metals, the first and second series of transition elements, lead, phosphorus, arsenic, antimony, bismuth, and aluminium; or (b) consists in a composition containing oxygen, sulphur or selenium, with the proviso that elemental sulphur; elemental selenium; elemental sulphur stabilized by having its vapour pressure lowered by its containing a minor proportion in relation to the sulphur of a stabilizing electronegative element such as selenium, arsenic, phosphorous and antimony; and elemental selenium stabilized by having its vapour pressure lowered by its containing a minor proportion in relation to the selenium of a stabilizing electronegative element such as sulphur, arsenic, phosphorous and antimony, are excluded, so that such sulphur and selenium, in elemental or stabilized form, are excluded as electrochemically active substances; or (c) consists in a composition of carbon, boron, silicon or nitrogen with an element or substance selected from the elements or substances of (a) and (b) above.

According to the invention there is provided an electrode for an electrochemical cell, the electrode comprising an electrochemically active substance as defined and a zeolite molecular sieve carrier wherein the electrochemically active substance is sorbed and is held in dispersed form for effective use in a cell.

In an embodiment of the invention, the electrode may be in the form of an anode for an electrochemical cell.

In this embodiment of the invention, the electrochemically active substance may conveniently be in the form of an electropositive substance comprising or including an alkali metal, a combination of alkali metals, an alkaline earth metal, a combination of alkaline earth metals, a combination or alloy of alkali and alkaline earth metals, or an alloy or composition containing alkali and/or alkaline earth metals.

Where the electropositive substance comprises an alkali metal, it may be in the form of any alkali metal but conveniently lithium, sodium or potassium.

Where the electrodepositive substance comprises a combination of alkali metals, it may be in the form of a combination of two or more of the alkali metals.

Where the electropositive substance comprises an alkaline earth metal, it may conveniently, for example, be in the form of calcium or magnesium.

Where the electropositive substance comprises a combination of alkaline earth metals, it may comprise a combination of two or more of the alkaline earth metals.

Where the electropositive substance comprises a combination or alloy of alkali and alkaline earth metals, it may be in the form of a combination of one or more alkaline metals with one or more alkaline earth metals in any desired proportions.

Where the electropositive substance comprises an alloy or composition containing alkali and/or alkaline earth metals, one or more of the alkali and/or alkaline earth metals may be included in the alloy or composition, and the remaining constituent of the alloy or composition may comprise any compatible metal or similar substance which can form a suitable alloy or composition with the alkali and/or alkaline earth metal.

Thus, for example, the remaining constituent may comprise silicon, aluminium, boron or the like.

Since the mass of the anode is often a factor of importance, in such instances the remaining constituent would preferably be a light metal or substance such as aluminium or silicon.

Applicants believe that from practical and economic considerations, alkali metals and alkaline earth metals such as rubidium, cesium, strontium, barium and beryllium, would not be preferred because of their cost and scarcity, because of the toxicity of beryllium, and because of the mass of the substances other than beryllium.

In an alternative embodiment of the invention, the electrode may be in the form of a cathode for a cell.

In this embodiment of the invention the electrochemically active substance may, for example, be in the form of an electronegative substance comprising a halogen, a mixture of halogens, or an interhalogen compound.

The electronegative substance may thus, for example, comprise fluorine, chlorine, bromine or iodine, a mixture of two or more of these halogens, or an interhalogen compound such as BrCl, ICl, IBr or the like.

In an alternative embodiment of the invention, where the electrochemically active substance comprises or includes one or more members of the group comprising the transition elements, the substance may be in elemental form, or in the form of an alloy, composition, mixture or combination including a transition element.

In this embodiment of the invention the electrochemically active substance may, for example, comprise or include a transition element halide, sulphide, selenide, oxide, or the like.

Conveniently, for example, the electrochemically active substance may be selected from one or more members of the group comprising the first series of transition elements (from Sc to Zn) rather than the second series of transition elements (from Y to Cd) because of the lower masses of the first series. This selection would, with the possible exception of silver, further tend to be justified by considerations of cost and availability.

In a specific embodiment of the invention the transition element may comprise or include Cr, Fe, Mn, Ti or V. In this embodiment of the invention, the electrode may be used either as an anode or a cathode by pairing it with an appropriate compatible electrode in a cell.

In an alternative embodiment the electrochemically active substance may comprise aluminium or phosphorous, or an alloy or composition including aluminium or phosphorous. In an example of this embodiment of the invention, the substance may conveniently be in the form of an aluminium or phosphorous halide, sulphide, selenide, oxide or the like, it being understood that elemental sulphur or selenium stabilized by having their vapour pressure lowered by their containing a minor proportion in relation thereto of phosphorous as a stabilizing electronegative element, are excluded as sulphides or selenides of phosphorous in this context, and are excluded from being electrochemically active substances for the purpose of the present invention.

Where the electrochemically active substance is a transition element and the electrodes are to be used in electrochemical cells where the charging processes are associated with the transfer of halide ions to the cathode either from the anode or the electrolyte, the electrodes may be activated by applying a voltage above the threshold voltage for halogenation of the transition metals or transition metal compounds of the electrodes.

The electrodes may be activated in situ where the threshold voltage is below the electrolysis voltage of the electrolyte.

If the threshold voltage is above the break-up voltage of the electrolyte of the cell, the electrodes may be activated separately or together in cells with appropriate electrolytes.

The activated electrodes may be loaded into cells in their charged, partially charged, or discharged states.

The zeolite molecular sieve carrier of the electrode of this invention may comprise natural or synthetic zeolites, modified zeolites which have been physically and/or chemically modified, or zeolite-like substances.

The term "zeolites" is meant to include the class of crystalline or amorphous natural or synthetic materials which contain aluminium and silicon in fairly definite proportions, and their analogues. For a more detailed discussion of zeolites reference can be made to the January 1975 publication of the International Union of Pure and Applied Chemistry entitled "Chemical Nomenclature, and Formulation of Compositions, of Synthetic and Natural Zeolites".

Zeolites contain sorbed water molecules which may be removed, usually reversibly, by heat and/or evacuation. Since electrochemical cells incorporating electrodes in accordance with this invention will usually not work effectively in the presence of even minor proportions of water, all references to zeolite molecular sieve carriers in this specification are to be regarded as reference to dehydrated or at least partially dehydrated zeolite molecular sieve carriers.

Zeolites are usually possessed of a reasonably ordered internal structure, exhibit a high internal surface area and are characterised by the presence of a multiplicity of regular arrays of molecular cavities.

It is believed that zeolites in their hydrated form can be represented by the following structural formula:

$$M_{2/n}O.Al_2O_3.XSiO_2.YH_2O$$

Where M is a cation of n valence; and X and Y are independent variables that are a function of the composition of the starting mixture, and the manner of formation.

In an embodiment of the invention, the molecular sieve carrier may comprise dehydrated or partially dehydrated zeolite crystals selected from the group of naturally occurring zeolites such as faujasite and erionite, or from the group of synthetic zeolites such as zeolite 3A, zeolite 4A, zeolite 5A, zeolite 13X, or the like structures.

Zeolite 4A has the structural formula:

$$Na_{12}((AlO_2)_{12}(SiO_2)_{12}).XH_2O$$

wherein the value of X can vary.

Zeolite 4A has a window diameter of about 4 Angstrom units and a cavity volume of about 1000 cubic Angstrom units.

Zeolite 13X has the structural formula:

$$Na_{86}((AlO_2)_{86}(SiO_2)_{106}).XH_2O$$

where X can vary over a wide range. Zeolite 13X has molecular cavities with diameters of about 13 Angstrom units.

It has been found that suitable zeolite crystals should have a sufficiently high physical strength for effective use in an electrode. In addition, it has been found that zeolite crystals which have been doped with an electrochemically active substance should be sufficiently resistant to electrochemical damage during repeated use as an electrode in a cell.

Thus physical or electrochemical failure of doped zeolite crystals should not be factors which contribute significantly, if at all, towards failure of a cell wherein the electrode of this invention is used.

It should be noted that the metal cation of zeolites, whether doped or undoped, can generally be substituted by other cations in an ion-exchange process.

If such ion-exchanged zeolites were to be employed as cathodes in cells, with the substitute cations constituting the primary, and indeed only, electrochemical reactants of the cathodes, the cathodes will tend to collapse physically and/or chemically during use of the cells. This is due to the fact that the ion-exchanged zeolites form an integral part of the cathodes.

The collapse of the cathode will therefore be a major contributing factor towards failure of such a cell which employs such an ion-exchanged zeolite as a cathode. In addition, it is this collapse which will combat effective recharging of such a cell, thereby making it entirely impractical for use as a secondary cell.

This is in direct contrast with the instant invention where the zeolite molecular sieve carrier is designed to constitute an electrochemically inert frame for the electrode which does not partake significantly in the electrochemical reaction. It is therefore designed to remain physically and electrochemically stable so that it will not collapse significantly as a result of the electrochemical reaction during normal use.

This aspect should therefore be borne in mind in selecting the particular zeolite molecular sieve carrier for use with a selected electrochemically active substance in carrying out this invention.

It should be noted, however, that when zeolites are doped with extremely electropositive substances such as alkali metals and alkaline earth metals, substantial modification of the zeolite lattice can result. It has been found, however, that such modified lattices still possess the necessary zeolite-like properties in that they can act as carriers for the alkali metals or alkaline earth metals, and are sufficiently electrochemically inert or relatively electrochemically inert during use in a cell.

Such zeolites which have been physically and/or chemically modified during doping with the selected electrochemically active substances but still possess the necessary zeolite-like properties, may therefore be usefully employed as zeolite molecular sieve carriers in the electrodes of this invention.

It should further be noted that in the case of some zeolites incidental cation exchange may occur during use of an electrode in accordance with this invention in some electrochemical cells. Thus, for example, lithium in an electrolyte can replace some sodium ions in a basic zeolite 3A lattice. Such reactions are well known and merely change the sizes of the windows and pores of the zeolite lattice. For example, if sodium ions are replaced by potassium ions in zeolite 4A, zeolite 3A is produced with the window sizes decreasing from 4 Angstroms to 3 Angstroms.

It should be appreciated, therefore, that while the zeolite molecular sieve carriers of the electrodes of this invention may, in certain instances, after doping, for example, with lithium or after having been subjected to several charge/discharge cycles in a cell, no longer strictly be in the form of zeolites as such, they may still be regarded as zeolites in the context of this invention since they exhibit the requisite zeolite properties.

Where the zeolite molecular sieve carriers of the electrodes of this invention are in the form of modified zeolites, they are such that while physically or chemically modified, they still possess appropriate molecular cavities for receiving and retaining the electrochemically active substances, and still possess pores which lead to the cavities and which have diameters of less than about 70 to 100 Angstrom units, and conveniently less than about 30 to 50 Angstrom units.

Where the zeolite molecular sieve carriers of this invention are in the form of zeolite-like substances, the zeolite-like substances are those which have cavities for receiving and retaining the electrochemically active substances, and which have pores leading to the cavities, with the pores having diameters of less than about 70 to 100 Angstrom units, and conveniently less than about 30 to 50 Angstrom units.

In an embodiment of the invention, the modified zeolites and the zeolite-like substances may conveniently be those having pore sizes of less than about 20 Angstrom units.

By taking into consideration factors such as pore size, cavity size, uniformity of pore and cavity size, the ability to sorb an electrochemically effective quantity of the electrochemically active substance, and the ability to hold the substance captive under operating conditions, a rough guide will be provided for the selection of the zeolite molecular sieve carriers for particular applications in accordance with this invention.

Further factors which can serve as a guide, can be the degree of porosity, the density, the availability, the mechanical strength, the stability and the electron conductivity of a doped zeolite molecular sieve carrier.

The zeolite molecular sieve carrier of the electrode should preferably therefore be such that the electrochemically active substance as defined when sorbed therein, will be held therein in finely dispersed form and preferably in atomic, molecular, atomic cluster or molecular cluster form to present its greatest availability for electrochemical activity during use.

The zeolite molecular sieve carrier should further preferably be such that it will hold an effective amount of electrochemically active substance captive for a sufficient period to allow the electrode to operate effectively in a cell for a reasonable period.

Conveniently, however, where the electrode is in the form of a cathode, the carrier may be such that the electrochemically active substance will be held captive during use of the cathode in a cell for which it was designed, throughout the normal operating temperature range of the cell, and without significant loss thereof during an appropriate operating period for the cell.

Applicants believe that these requirements can, in general, be provided by the majority of suitable available natural and synthetic zeolites, so that these specific selection criteria will be of importance primarily in the case of modified zeolites and zeolite-like substances.

To operate effectively as an electrode, the electrode of this invention must permit appropriate ions to diffuse therethrough during use in a cell.

If follows that the zeolite molecular sieve carrier must therefore act as an ionic conductor when doped with the electrochemically active substance.

By "doped molecular sieve carrier" is meant that the carrier has the electrochemically active substance sorbed therein in accordance with this invention.

In general, the higher the ion conductivity of the electrode, the better will be the performance of a cell using such an electrode.

It follows automatically that the electrode of this invention must be electron conductive. In this regard, it should be noted that natural and synthetic zeolites are, in general, poor electron conductors.

The zeolite molecular sieve carrier may therefore be selected so that it is sufficiently electron conductive when it has an effective quantity of the electrochemically active substance sorbed therein.

If this is not the case, an electron conductive material must be included in the electrode.

The electrode of this invention will therefore, where necessary, or when desired, include a suitable electron conductive material to provide sufficient electron conductivity between individual crystals through the electrode and hence to enhance the electron conductivity of the electrode.

In an embodiment of the invention, the electron conductive material may be any suitable electron conductive material at the operating temperature of the cell, e.g. graphite, $MoS_2$, or the like.

Where the electron conductive material is in the form of graphite, it may be in the form of a porous coating on the zeolite molecular sieve carrier crystals, or in the form of a powder mixed with the crystals. By 'porous' is meant a coating that allows free access of the electrolyte into the zeolite pores, cavities or channels.

The graphite layer should be porous and conveniently the proportion thereof should be as low as possible consistent with effective electron conduction during use since graphite can act as an electrolyte barrier.

In practice therefore the proportion of electron conductive material to molecular sieve carrier, should be selected to provide a desired balance between electrolyte access and electron conductivity during use in a cell.

A further factor is that the total mass of the electron conductive material should be as low as possible to give the maximum energy to weight ratio.

In a series of experiments which were conducted, finely divided graphite in powder form was mixed with undoped zeolite crystals and pellets were formed containing various proportions of graphite and zeolite.

It was found that between about 5 and 16% of graphite had to be added to the zeolite to obtain a sufficiently electron conducting pellet for effective use.

Conveniently, however, substantially greater proportions of powdered graphite may be included if required.

In embodiments of the invention therefore, the electrode may include between 5% and 60% by weight of graphite powder.

For loosely compacted structures it will be appreciated that where the electrode comprises a mixture of graphite powder and zeolite crystals, if the graphite particle sizes are too small, electrolyte movement through the electrode will be retarded during use but electronic conductivity will be improved, and vice versa if the graphite particle sizes are too large. In practice therefore a suitable balance will have to be drawn in this regard.

Instead of using graphite in powder form, a series of experiments were conducted using graphite in the form of a colloidal suspension.

In the experiments, relatively low concentrations of the graphite colloidal suspension were used to treat zeolite samples. After drying it was found that the treated zeolite was electron conducting and it is believed therefore that a graphite coating must have been formed on the zeolite crystals.

Zeolite crystals may also be coated with graphite using other techniques such as, for example, vapour phase coatings.

In further examples of the invention, the zeolite molecular sieve carrier of this invention may be made electron conducting by cracking organic vapours on the crystal surfaces, cracking resins or pitches which have been mixed with zeolite crystals, cracking metal carbonyl vapours such as, for example, tungsten hexacarbonyl, cracking tetrafuran, or the like.

It follows that where the zeolite molecular sieve carrier is a non-electronic conductor and the sorbed electrochemically active substance is a poor electronic conductor there will be poor utilization of the sorbed active substance and a high internal cell resistance.

These limitations may be overcome by impregnating some of the zeolite molecular sieve carrier cavities with an electrochemically inert current collector (which does not take part in electrochemical action of the cell). This may conveniently be done before sorbing of the electrochemically active substance into the carrier.

The inert current collect may, for example, be in the form of silver, aluminium, carbon, or the like.

This procedure may also be followed where the electrode of this invention is designed to constitute an anode in an electrochemical cell where the discharge mechanism involves migration of cations from anode to cathode. The residual inert current collector in the electrode will tend to prevent the anode from becoming non-conductive towards the end of a discharge cycle. This would be of particular importance in the case of cells where the capacities are anode limited.

The electrode of this invention may be in the form of a self-supporting structure or matrix by being suitably compacted, by being suitably compacted with or supported by a binding agent, by being held in a supporting structure or matrix, by being contained in or located on a porous electrode holder, or the like.

In an embodiment of the invention, the electrode may be contained in a suitable porous, corrosion-resistant electrode holder.

In an example of this embodiment of the invention, the holder may be in the form of a porous graphite cup or vessel.

Where the electrode of this invention is in the form of a compacted electrode, the molecular sieve carrier may be compacted before or after the substance has been sorbed therein, but conveniently after the substance has been sorbed therein.

The molecular sieve material or electrode, as the case may be, may for example be compacted by a pressing operation, by a hot pressing operation, by a sintering operation, by a sintering accompanied by a press operation, or the like.

The reason for performing these operations is to optimize volume, increase electron conductivity and to produce a required shape. The choice of the forming process will be defined by:

(a) the nature of the molecular sieve carrier and dopant in terms of its breakdown temperature and mechanical properties, (b) the physical shape/size required, (c) the electrochemical properties required.

Compaction of the electrode can improve interparticle contact thereby providing for enhanced electron conductivity. Compaction of the electrode can, however, reduce the porosity of the electrode and thus influence the diffusion of the electrolyte into the electrode during use.

Compaction of the electrode can be carried out to provide electrode discs or pellets which have sufficient mechanical rigidity to be substantially self-supporting.

Where the discs or pellets have sufficient mechanical rigidity to be self-supporting, they could be used in a cell without any form of holder. Conveniently, however, they may nevertheless still be used in a holder such as a porous cup or bag so that even if they do fracture during use, or the cup or bag fractures during use, the electrode will still remain largely intact.

Compaction of the molecular sieve carrier or of the electrode, as the case may be, may therefore be carried out to balance the requirements of mechanical rigidity and improved electron conductivity against the requirement that electrolyte access to the electrochemically active substance within the electrode should be sufficient during use to provide a sufficient current density.

Where the molecular sieve carrier or the electrode, as the case may be, has been properly compacted, it can provide the advantage that the volume to mass ratio of the electrode has been improved. It can provide the further advantage that since enhanced electron conductivity can be provided, the relative mass of the electron conductive coating material may be reduced, thereby permitting the use of an electrode of a relatively reduced mass.

In addition, where the electrode is substantially self-supporting it can be handled more easily.

Zeolites can be made into extremely thin plates (such as, for example, plates having thicknesses of 0.1 mm) by means of appropriate pressing techniques. Such plates can be particularly suitable for use with organic electrolytes and solid electrolytes which, by their very nature, exhibit poor ionic conductivity when compared with the better molten ionic salt electrolytes.

The invention further extends to an electrode in accordance with this invention having an electrochemically active scavenger body electronically connected thereto for scavenging free electrochemical reaction products during use in a cell, the active scavenger body comprising a body of dehydrated zeolite crystals treated with an electron conductive material to make the active scavenger body electron conductive.

This scavenging process in fact represents the in situ formation of an electrochemically active impregnated zeolite body in a cell, which can subsequent to its formation take part in the overall cell reaction.

The electron conductive material, and treatment of the zeolite crystals therewith, may be as described previously in this specification.

In an embodiment of the invention the electrode may conveniently be in physical contact with the active scavenger body. If desired, the electrode may be surrounded by or housed within the active scavenger body.

In this embodiment of the invention the electrode and scavenger body may be formed by compacting a layer of dehydrated electronically conductive zeolite particles onto a formed electrode, or by only partially sorbing an electrochemically active substance into a zeolite molecular sieve carrier thereby leaving the remaining sorbtion capacity of the carrier to serve as a scavenger body.

Since the scavenger body is electronically conductive and is electronically associated with the electrode, it will constitute part of the electrode and can therefore contribute to the capacity of a cell during use.

The free electrochemical reaction products to be scavenged may be those which become detached from the electrodes and current collectors during use.

The invention further extends to a composite electrode comprising an electrochemically active electrode of any conventional type, and an active scavenger electronically connected to the electrode for scavenging free electrochemical reaction products during use, the active scavenger comprising a body of dehydrated zeolite crystals treated with an electron conductive material to make the scavenger body electron conductive.

In an example of this aspect of the invention, the electrode may comprise iron sulphide, iron disulphide, iron sulphide sorbed into dehydrated graphite coated zeolite, or iron disulphide sorbed into dehydrated graphite coated zeolite, and an active scavenger body comprising a layer of carbon bonded dehydrated zeolite surrounding the electrode and in physical and electronic contact therewith.

In this example of the invention, during use of such an electrode as a cathode in a cell together with, for example, a Li:Al anode and a molten ionic salt electrolyte such as, for example, KCl:LiCl or LiI:KI, free products such as iron chloride, sulphur and alkali polysulphides will be scavenged by the scavenger body.

This can provide the advantage that not only can cell fouling be reduced by the removal of such products, but the formation of complex phases such as the well known "J" phase in secondary reactions can be combatted by the scavenging of the primary chemical products needed for its formation.

It is further believed that the presence of such a scavenger body which is electronically connected to the cathode, can improve the ability of such a cell to tolerate over charging and over discharging.

The invention further extends to an electrochemical cell including a pair of compatible electrodes and a compatible electrolyte, at least one of the electrodes comprising an electrode as hereinbefore described.

Where only one of the electrodes is in the form of an electrode as hereinbefore described, the remaining electrode may be in the form of any compatible electrode.

Thus, in one example of the invention, the remaining electrode may be in the form of an anode comprising or including an alkali metal, a combination of alkali metals, an alkaline earth metal, a combination of alkaline earth metals, a combination or alloy of alkali and alkaline earth metals, or an alloy or composition containing alkali and/or alkaline earth metals.

In an alternative example of the invention, the remaining electrode may be in the form of a cathode comprising or including an electronegative substance which is held captive for effective operation in a cell by being in the form of a suitable alloy, compound or element.

In an alternative example of the invention, the remaining electrode may be in the form of an anode or a cathode, and may comprise or include a transition metal or transition metal compound, alloy or composition.

A cell in accordance with this invention may conveniently have both electrodes in the form of electrodes as hereinbefore described.

The invention further extends to an electrochemical cell including a pair of electrodes and an electrolyte, and including an electronically conductive active scavenger body as hereinbefore described, electronically connected to one of the electrodes.

The electrolyte of the cell may be in the form of a solid electrolyte, an electrolyte which is liquid at the operating temperature of the cell, or an electrolyte comprising an electrolyte sorbed or impregnated in a suitable molecular sieve carrier.

Where the electrolyte is sorbed or impregnated into a molecular sieve carrier, the molecular sieve carrier may conveniently be in the form of a carrier as hereinbefore described.

In an embodiment of the invention, the molecular sieve carrier may conveniently be in the form of dehydrated or partially dehydrated zeolite crystals.

In an embodiment of the invention the electrolyte may comprise a source of disassociated metal and halide ions.

Thus, for example, the electrolyte may include alkali metal or alkali earth metal halide salts such as sodium chloride, calcium chloride, calcium fluoride, magnesium chloride, lithium bromide or the like.

In an alternative embodiment of the invention, the electrolyte may comprise binary, ternary etc. salt mixtures of alkali metal and/or alkaline earth metal halide salts.

Thus, for example, the electrolyte may comprise lithium iodide-potassium iodide, lithium chloride-potassium chloride, lithium chloride-magnesium chloride, lithium bromide-potassium bromide, lithium fluoride-rubidium fluoride, lithium chloride-lithium fluoride, calcium chloride-lithium chloride and the like.

In an alternative embodiment of the invention, the electrolyte may comprise an alkali metal or alkaline earth metal halide electrolyte dissolved in an aprotic solvent.

The aprotic solvent may be any suitable solvent such as, for example, propylene carbonate or the like.

In an alternative embodiment of the invention, the electrolyte, for example, molten alkali metal halide salts, may be doped with an aluminium halide (e.g. $AlCl_3$) or with some other suitable dopant to reduce the melting point of the electrolyte.

Thus, for example, the electrolyte may be in the form of an alkali metal halide-aluminium halide mixture or a double salt or in the form of an alkaline earth halide-aluminium halide mixture or a double salt or a mixture thereof.

Thus, for example, the electrolyte may comprise $NaAlCl_4$; $LiAlCl_4$; $KAlCl_4$; $NaAlBr_4$; $LiAlBr_4$; $KAlBr_4$; $NaAlI_4$; $LiAlI_4$; $KAlI_4$; $Mg(AlCl_4)_2$; $Ca(AlCl_4)_2$; $Mg(AlBr_4)_2$; $Ca(AlBr_4)_2$; $Mg(AlI_4)_2$; $Ca(AlI_4)_2$, or the like.

Where the electrolyte is a mixture or a melt it may conveniently be an eutectic mixture or melt.

In an example of the invention a cell in accordance with this invention may be formed in which the anode comprises lithium or sodium in porous form, lithium or sodium sorbed into a molecular sieve carrier such as zeolite crystals or a lithium-aluminium alloy or a lithium-silicon alloy.

In this example of the invention, the cathode may be in the form of a transition element halide which is sorbed into a molecular sieve carrier such as zeolite crystals.

Thus, for example, the transition element halide may be in the form of cobalt chloride, iron chloride, chromium chloride, titanium chloride or manganese chloride.

In forming the cathode of this example, the zeolite crystals may be dehydrated or at least partially dehydrated, and may be doped using conventional techniques which are applicable to the electrochemically active substance in question. Thus, for example, $FeCl_3$ could be impregnated directly into zeolite crystals either from the liquid or vapour phases. In an alternative example, where the electrochemically active substance is chromium chloride, chromium could be sorbed into zeolite crystals as a low melting point chromium oxide, and then reduced to chromium metal with hydrogen. Thereafter the chromium could be chlorinated prior to use or, where the electrolyte phase is suitable, it could be chlorinated during charging.

Applicants believe that cathodes in accordance with the examples given, will be in the form of three dimensional cathodes wherein the transition elements are sorbed into the zeolite, and will be held captive in the zeolite during normal operation of a cell incorporating such a cathode in a highly dispersed and electrochemically reactive state. Therefore, in favourable circumstances, each ion of the transition element should be able to take on a high oxidation state thereby allowing for utilisation of its full electrochemical potential.

In selecting the electrochemically active substance for the cathode, it would be advantageous to select the lightest materials with the highest possible negative oxidation potentials which can be sorbed into the molecular sieve carrier in a highly dispersed state, and which can be held captive in the molecular sieve carrier during normal operation of the cell at the operating temperatures for which the cell is designed, to allow the cell to operate effectively for a sufficient period.

In this example of the invention the electrolyte phase may be any convenient electrochemically compatible electrolyte phase.

In selecting the electrolyte the following factors would tend to be of importance:

the electrolyte should have a low melting point, should be non-corrosive and non-toxic, should be compatible with the anode and cathode, should have a low density, a high specific conductivity, and the highest possible decomposition potential, and should be chemically and thermally stable under operating conditions.

In this example of the invention the electrolyte may conveniently be in the form of a lithium-aluminium-chloride eutectic melt which has a melting point of about 100° C. Alternatively, the lithium-aluminium-chloride melt may be doped with various alkali metal halides or alkali earth halides to reduce the melting point below 100° C.

In this example of the invention, where the cathode is $FeCl_3$, it is believed that $LiFeCl_4$ may form on the charged cathode, and this is not soluble in the $LiAlCl_4$ electrolyte. If this is so, the Fe ions will therefore be inhibited from being mobile. This will be doubly so if the Fe ions are also trapped within the zeolite crystals wherein they are sorbed.

Applicants believe that similar considerations will apply where the other transition elements are used as the cathode instead of iron.

A disadvantage which may be presented by the experimental cell is that when the cell is charged and the Fe of the cathode is converted to $FeCl_3$, the cathode will become steadily less electronically conducting. This may therefore limit the depth of charge. It may therefore be advantageous to add a small proportion of a suitable inert current collector such as, for example, a noble metal or graphite to the cathode to improve its inherent electrical conductivity. This should then permit a greater depth of charge.

Applicants believe that in this example of the invention the lithium-aluminium-chloride electrolyte has the advantages that it has a low melting point, that it is compatible with the transition metal chloride cathodes, that it is compatible with appropriate anodes, that it is compatible with the zeolites, and that it is inexpensive.

Applicants believe that the relatively low electrolyte melting point could permit the use of cheaper and lighter cell casings than would otherwise be possible, and the use of relatively unsophisticated heating systems.

These aspects can provide substantial savings in terms of costs and power/weight considerations.

From experiments of a preliminary nature which have been performed, Applicants believe that by selecting an appropriate alkali metal or alkali metal alloy for the anode and an appropriate electrolyte phase, the choice of cathode may, in certain circumstances, be based on factors other than purely the degree of electronegativity of the cathode in relation to the anode.

This can, for example, be illustrated by comparing an electronegative element such as sulphur with an electronegative element such as iron in a cell where the anode is lithium and the electronegative element is sorbed into dehydrated zeolite crystals.

In the case of the sulphur cell, sulphur has a maximum oxidation state of $S^{-2}$. The capacity is 1.67 Amp-hr/g (based on the mass of the electrochemically active element only). Sulphur is cheap, but because of the electrolytes which are usually employed, the required cell operating temperature is usually at least about 250° C. so that elaborate heating systems and stainless steel housings will be required.

In the case of the iron cell, iron has a maximum oxidation state of $Fe^{+3}$. The capacity of the electrode is 1.44 Amp-hr/g (based on the mass of iron only). Fe and $FeCl_3$ are cheaper than sulphur. When using or incorporating an alkali halide-alkali aluminium halide as electrolyte, for example, the cell operating temperature would be about 100° C. or less thereby allowing the use of relatively unsophisticated heating systems and the use of cheaper and lighter housings such as, for example, housings of synthetic plastics materials.

It is believed however, that the lesser degree of electronegativity of iron in relation to sulphur can be compensated for if the full oxidation potential of the iron can be utilised and if factors such as cheapness, cheaper cell housings and cheaper heating systems can compensate for the mass disadvantage of iron over sulphur.

It must be borne in mind however, that if the electochemically active substances are sorbed into zeolite crystals, it will also be necessary to take into consideration the percentage sorption and the mass of the zeolite crystals.

This comparison indicates that electronegative elements such as vanadium, chromium and manganese which are sorbed into zeolite crystals may even be preferred to iron since these elements are both lighter and have higher maximum oxidation states. This is illustrated in the following table.

| Element | Valence | Amp-hr/g* |
|---------|---------|-----------|
| Fe | 3 | 1,44 |
| Mn | 4 | 1,95 |
| V | 5 | 2,6 |
| Cr | 6 | 3,09 |
| S | 2 | 1,67 |

*Capacity - based on mass and full oxidation state change of the electrochemically active element only.

Cells in accordance with this invention can have application both as primary cells, and as secondary or rechargeable cells.

However, certain cells in accordance with this invention will generally tend to be effective only as primary cells.

Thus, for example, where the electrode comprises sodium in a zeolite molecular sieve carrier, during charging of such a cell the sodium will not penetrate the zeolite lattice and may tend to plate preferentially on the outer surface of the electrode.

Such a cell will therefore tend to operate in a primary sense only.

Similar considerations will tend to apply in the case of lithium.

If further examples, cells in which the cathodes comprise halogens sorbed into molecular sieve carriers, will also tend to work only as primary cells.

It will be appreciated that cells in accordance with this invention can readily be assembled in battery form.

Embodiments of the invention are now described by way of example with reference to the accompanying drawings and to certain experiments and preliminary experiments which have been conducted.

Figure 2:
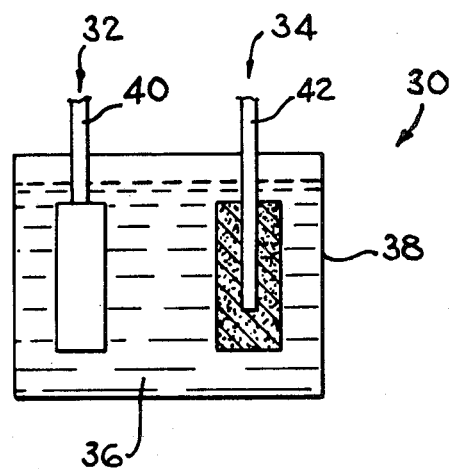

In the drawings:

FIG. 1 shows a schematic arrangement of one embodiment of an electrochemical cell in accordance with this invention; and FIG. 2 shows a schematic arrangement of a typical electrochemical cell in accordance with this invention, as employed for the purposes of the experiments and preliminary experiments which were conducted.

With reference to FIG. 1, reference numeral 10 refers generally to an electrochemical cell in accordance with this invention, comprising an anode 12, a cathode 14, and an electrolyte 16 housed within a casing 18.

The anode 12 comprises an electropositive substance comprising an alloy of lithium and aluminium.

The electrolyte 16 comprises a molten salt electrolyte such as KCl:LiCl (which provides an operating temperature of about 400° C.), or LiI:KI (which provides an operating temperature of about 300° C.).

The cathode 14 is in the form of a composite cathode in accordance with this invention. It comprises a steel or iron current collector 20 which has its lower end embedded in a porous cathode compact 22 of iron sulphide or iron disulphide with some dehydrated graphite coated zeolite crystals.

The cathode 14 further includes an electron conductive scavenger body 24 which is electronically connected to the cathode 14.

The scavenger body 24 comprises a layer of dehydrated zeolite particles compacted onto the cathode compact 22.

The zeolite particles of the scavenger body 24 have been treated with graphite as hereinbefore described, to make the zeolite particles electron conductive. Treatment with graphite further facilitates bonding of the scavenger body layer onto the cathode compact 22.

It will be noted that the cathode compact 22 is totally enclosed within the scavenger body 24. It will further be noted that the scavenger body 24 surrounds the portion of the current collect 20 which is within the casing 18.

In this embodiment of the invention, during use of the cell 10, undesired electrochemical reaction products such as iron chloride, sulphur and iron will be scavenged by the scavenger body 24.

This can provide the advantage that not only will cell fouling be reduced by the removal of such products, but the formation of complex phases such as the well known "J" phase in secondary reactions can be combatted by the scavenging of the primary reaction products.

It will be appreciated that after several charge/discharge cycles of the cell 10, the scavenger body 24 will in fact constitute an electrode for the cell 10 since it has scavenged electrochemically active substances, since it is electron conductive, and since it is electronically connected to the cathode compact 22 and current collector 20.

It follows therefore that the scavenger body 24 will constitute an electrode comprising an electrochemically active substance sorbed into a zeolite molecular sieve carrier in accordance with this invention.

Since the scavenger body 24 will thus constitute an additional cathode, it is believed that it can contribute to the capacity of the cell 10 and can improve the ability of the cell 10 to tolerate over charging and over discharging.

In preliminary experiments conducted with such a cell, it was found to have an open circuit voltage of about 1.6 V, a shortcircuit current of about 1 A, and a capacity of about 150 mA-h/g.

With reference to FIG. 2 of the drawings, reference numeral 30 refers generally to an electrochemical cell comprising an anode 32, a cathode 34 and an electrolyte 36 housed within a casing 38.

The anode 32 is shown having a current collector 40, whereas the cathode 34 is shown having a current collector 42.

A number of experiments and preliminary experiments were conducted with various electrochemical cells in accordance with this invention utilising the schematic cell arrangement of the cell 30.

Experiments were conducted with seven types of electrochemical cells. The specific details of the seven types of cells, and the average of the results of the various experiments, are set out Tables I and II below.

allow it to diffuse in and be retained in the zeolite cavities.

TABLE I

| Experiment Number | 1. | 2. | 3. | 4. |
|---|---|---|---|---|
| Impregnated Zeolite (Ze) | Ze—13X/CrO$_3$ | Ze—13X/P | Ze—4A/AlCl$_3$ | Ze—4A/Cl$_3$ |
| Anode | Li—Al (excess) | Li—Al (excess) | Ze—4A/AlCl$_3$ | Li—Al (excess) |
| Cathode | Ze—13X/CrO$_3$ (3g) | Ze—13X/P (2g) | Ze—4A/FeCl$_3$ (excess) | Ze—4A/FeCl$_3$ (3g) |
| Electrolyte | LiCl—KCl | LiCl—KCl | LiAlCl$_4$ | LiCl—KCl |
| Open Circuit Voltage | 1,2 | 1,7 | 1,0 | 1,80 |
| Shortcircuit Current (mA)* | 180 | 250 | 700 | 1250 |
| Capacity (mA-h/g) | 123 | 130 | 66 | 200 |
| Coulombic Efficiency (%) | 50 | 87 | 53 | 60 |
| Operating Temp (°C.) | 400 | 400 | 200 | 420 |
| Cell life time (cycles) | 6 | >10 | >37 | 22 |

*Electrode surface area ≈ 3 cm$^2$
**Primary cell

TABLE II

| Experiment Number | 5 | 6 | 7 |
|---|---|---|---|
| Impregnated Zeolite (Ze) | Ze—4A/Cl$_2$** | Ze—4A/Br$_2$** | Ze—4A/Li |
| Anode | Li—Al (excess) | Li (excess) | Ze—4A/Li (3g) |
| Cathode | Ze—4A/Cl$_2$ (3g) | Ze—4A/Br$_2$ (3g) | Ze—4A/S (excess) |
| Electrolyte | LiCl—KCl | LiBr in Propylene Carbonate | LiCl—KCl |
| Open Circuit Voltage | 1,80 | 2,4 | 1,8 |
| Shortcircuit Current (mA)* | — | 10 | — |
| Capacity (mA-h/g) | 400 | 12 | 64 |
| Coulombic Efficiency (%) | — | — | — |
| Operating Temp (°C.) | 400 | 20 | 400 |
| Cell life time (cycles) | ½ | ½ | 10 |

*Electrode surface area ≈ 3cm$^2$
**Primary cell

In regard to the experiments which were conducted as indicated in Tables I and II above, it should be noted that an electronically conductive material such as graphite was incorporated in the zeolite to provide sufficient electron conductivity for effective cell operation.

While there are certain instances where the doped zeolite crystals show sufficiently good electronic conductivity (such as, for example, a zeolite 4A silver electrode), it is normally desirable to enhance electronic conductivity of the electrodes in accordance with this invention by the inclusion of an electron conductive material.

While the experiments summarised in the above Tables involved only the use of zeolite 4A and 13X as zeolite molecular sieve carrier, further experiments established that any other zeolite molecular sieve carrier in accordance with this invention could be used provided the pores and cavities of the lattice were appropriate for the electrochemically active substance to In addition to the experiments as summarised in the above Tables, certain preliminary experiments were conducted using alkaline earth metals instead of alkali metals as electrochemically active substances. Thus, for example, a preliminary experiment was conducted using Ze-4A/Ca (graphite) as anode; Ze-4A/S (graphite) as cathode; and LiI:KI as electrolyte.

This cell provided a preliminary open circuit voltage of about 1.6 volts, a shortcircuit current of above 800 mA, and a capacity of about 100 mA-h/g.

It was found however that impregnation of the carrier with alkaline earth metals was more difficult than in the case of alkali metals.

In addition to the experiments indicated above, a further preliminary experiment was conducted with iron sulphide as the electrochemically active substance.

Iron sulphide was impregnated into zeolite 13X which had been treated with graphite to improve its electron conductivity.

Impregnation was achieved by impregnating zeolite 13X for example with FeCl$_2$ or FeCl$_3$. Thereafter, the FeS was precipitated within the zeolite cavities by means of sulphide ion introduction from, for example, Na$_2$S solution or H$_2$S gas.

In the preliminary experiment which was performed, the anode was Li:Al while the electrolyte was LiI:KI.

This cell provided an open circuit voltage of about 1.4 volts, a shortcircuit current of about 500 mA, and a capacity of about 120 mA-h/g.

Insofar as the fourth series of experiments are concerned which are indicated in Table I above, it should be noted that FeCl$_3$ sorbed in zeolite will be reduced to elemental iron when the cell is fully discharged. It follows therefore that the electrochemically active substance is in the form of elemental iron sorbed into zeolite in the discharged state of the cathode.

This would apply equally to other transition elements.

In further preliminary experiments conducted with the transition elements, it was found that both silver and copper could readily be sorbed into zeolite 4A crystals to form anodes for electrochemical cells.

Cells can be constructed with such anodes by, for example, using a cathode in the form of a Ze-5AI$_2$ (graphite), and using an electrolyte such as a propylene carbonate LiCl solution.

Where the anode included silver as the electrochemically active substance, a preliminary experiment yielded an open circuit voltage of about 0.5 volts, a shortcircuit current of about 20 mA, and a capacity of about 30 mA-h/g.

In a further experiment which was conducted Li:Al was used as anode, $LiAlCl_4$ was used as electrolyte, and Ze-4A/$Na_2S_x$ was used as cathode.

This cell provided an open circuit voltage of 1.86 volts, a shortcircuit current of 800 mA, and a capacity of 150 mA-h/g, a coulombic efficiency of 74%, an operating temperature of 200° C., and a cell life time of more than 42 cycles.

In sofar as the seven series of experiments are concerned which are dealt with in Tables I and II above, the following conclusions may be drawn:

EXPERIMENT NO. 1

Since this cell had the best discharge characteristics on the first cycle, this could indicate that it may have greater potential as a primary cell than as a secondary cell. The low coulombic efficiency could be due to internal shortcircuit caused by lithium particles between anode and cathode.

Since there was very little electronic conduction, initial discharge was good. This would also have limited the shortcircuit current.

It is believed that the relatively short life was due to $CrO_3$ escaping out of the zeolite crystal structure since impregnation was done at 250° C. Applicants are satisfied that pinning of the electrochemically active substance would be much more effective with a lower temperature electrolyte such as, for example, $LiAlCl_4$, and would provide for effective pinning in the zeolite during use.

EXPERIMENT NO. 2

Red phosphorous was impregnated into zeolite 13X at 265° C. for six days. This zeolite was chosen since its windows which give access to the internal channels and cavities of the zeolite, have free diameters of 8 to 9 Angstrom units. Thus $P_4$ molecules can readily diffuse into the zeolite lattice.

It is believed however that the life of such a cell could probably be improved by using zeolite 5A. This zeolite has windows or pores which give access to the zeolite cavities, with free diameters of 4.5 Angstrom units. Tetrahedral $P_4$ molecules have diameters of about 7 Angstrom units. For impregnation therefore $P_4$ molecules would have to disassociate into $P_2$ molecules which could be sorbed into the zeolite. Inside the zeolite cavities $P_4$ molecules could again form from the $P_2$ molecules and they would thus be firmly pinned within the zeolite molecular sieve carrier for effective use in a cell.

This cell should again have a much longer and thus effective life with a lower operating temperature by using an alternative electrolyte.

EXPERIMENT NO. 3

Substantial sorbtion of $AlCl_3$ into the zeolite 4A provided a high shortcircuit current. Coulombic efficiency was low because of dendrite formation.

A long initial cell charge was required since it was necessary to activate the anode and thereafter charge the anode.

With a better separator than the ceramic seprator used (which constituted a backbone for dendrite formation) it is believed that the life of this cell could be improved substantially.

EXPERIMENT NO. 4

After the fourth cycle the cell discharge capacity steadily decreased. After 22 cycles (14 days) the capacity had been reduced to about 45 mA-h/g.

It is believed that this reduction in cell capacity is attributable to the loss of $FeCl_3$ from the zeolite by dissolution into the electrolyte because of the high operating temperature.

At a lower operating temperature which can be provided by using a different electrolyte, the $FeCl_3$ should be pinned by the zeolite sufficiently for effective use in a secondary cell.

EXPERIMENT NO. 5

This cell shows promise as a primary cell because of the good performance figure on the first cycle (capacity=400 mA-h/g). The cell capacity dropped to 100 mA-h/g on the second discharge cycle after which the cell showed no significant activity.

EXPERIMENT NO. 6

It is believed that low shortcircuit current was mainly due to the difficulty in dissolving lithium bromide in the organic solvent, to the problem of drying the organic solvent and to the difficulties experienced in keeping the anode surface clean.

With proper procedures these difficulties could be overcome and it is believed that the shortcircuit current could be increased.

EXPERIMENT NO. 7

It is believed that cells of this type will tend to be useful primarily as primary cells since lithium tends to plate preferentially onto the outer surface of the anode during charging and does not tend to re-enter the zeolite cavities.

In addition, from experiments which have been conducted, it was found that the lithium tends to chemically modify the zeolite structure during sorption. Nevertheless, the modified zeolite structures appears to retain sufficient zeolite-like properties to allow the anode of this experiment to provide anodic activity. The capacity of this cell was, however, relatively low.

It will be noted from the experiments referred to in Tables I and II that the operating temperatures of the cells were high in the majority of experiments. This was due to the particular electrolytes employed.

The extent to which electrochemically active substances are held (or immobilized) in zeolite molecular sieve carriers will depend upon the choice of zeolite, the choice of electrochemically active species and the operating temperature.

It follows therefore that where the operating temperatures are reduced to more realistic levels of say about 250° C. to about 100° C. or less, the electrochemically active substances will be held firmly by the zeolite molecular sieve carriers for effective use in cells.

Furthermore, where the zeolite molecular sieve carrier is matched with the electrochemically active substance in relation to pore and cavity size, the electrochemically active substance will be firmly retained in the carrier for effective use.

Furthermore, when sorbed in a zeolite molecular sieve carrier an electrochemically active substance willbe held therein in finely dispersed atomic, molecular, atomic cluster or molecular cluster form to be freely accessible and available or electrochemical activity.

It follows from the above that electrochemically active substances contained in macroscopically porous materials such as physical sponges, metal sponges, active carbons, felts and the like cannot even remotely be compared with electrons in accordance with this invention comprising electrochemically active substances sorbed into microporous materials such as zeolite molecular sieve carriers, either in relation to extent of dispersion or in relation to the extent of pinning of the active substance.

It will further be appreciated that the zeolite molecular sieve pinning characteristics which are desired for an electrode will differ depending upon whether the electrode is a cathode or an anode and upon whether or not electrochemical activity will involve the migration of active ions relatively to the anode.

Insofar as other methods of pinning are concerned, such as by using electrochemically active substances in the form of compounds or alloys, it must be appreciated that they invariably reduce the electrochemical activity of the active substances and thus the cell voltages and energy densities. In contrast therewith, pinning of an electrochemically active substance in a zeolite molecular sieve carrier will not reduce electrochemical activity but will in fact have the effect of making the active substance more available and accessible and thus more reactive.

Zeolite molecular sieve carriers can provide the further advantage that the smaller the pore sizes of the lattice, the harder it will be for a sorbed substance to become desorbed. This can therefore allow higher potential operating temperatures.

In certain instances, zeolite molecular sieve carriers can provide the further advantage that oversized chemical species will physically not be able to enter the cavities. Thus active species pinned within the zeolite carrier cavities can be protected against reactions which could otherwise poison the cells.

I claim:

1. An electrochemical cell including a pair of compatible electrodes and a compatible electrolyte, at least one of the electrodes comprising an electrochemically active substance which comprises one or more elements selected from the group consisting of the halogens, the alkali metals, the alkaline earth metals, the first and second series of transition elements, lead, phosphorous, arsenic, antimony, bismuth and aluminium and a zeolite molecular sieve carrier having pore sizes of less than 100 Angtrom units wherein the electrochemically active substance is sorbed and is held in dispersed form in the cavities thereof for effective use in the cell, and the electrochemically active substance being such that any exchangeable cations of the zeolite molecular sieve carrier make a negligible contribution to the cell reaction, and substantially all the power and energy of the cell is provided by the eldctrochemically active substance held in dispersed form in the cavities in the carrier.

2. A cell according to claim 1, in which the electrochemically active substance is selected from members of the group consisting in the first series of transition elements.

3. A cell according to claim 2, in which the electrochemically active substance comprises an alloy or composition including such a transition element.

4. A cell according to claim 3, in which the electrochemically active substance comprises a transition element halide, sulphide, selenide or oxide composition.

5. A cell according to any one of claims 2 to 4, in which the transition element comprises Cr, Fe or Mn.

6. A cell according to claim 1, in which the electrochemically active substance comprises aluminium or an aluminium alloy or a composition.

7. A cell according to claim 6, in which the electrochemically active substance comprises an aluminium halide, sulphide, selenide or oxide.

8. A cell according to claim 1, in which the electrochemically active substance comprises phosphorous or a phosphorous alloy or composition.

9. A cell according to claim 1, in which the zeolite molecular sieve carrier comprises dehydrated natural or synthetic zeolite crystals.

10. A cell according to claim 9, in which the zeolite crystals are selected from the group consisting in faujisite, erionite, zeolite 3A, zeolite 4A, zeolite 5A and zeolite 13X.

11. A cell according to claim 9, in which the zeolite molecular sieve carrier has graphite in admixture therewith to provide effective electron conductivity through the electrode.

12. A cell according to claim 9, in which the electron conductivity of the electrode is enhanced by an electrochemicall inert current collector impregnated into some of the carrier cavities.

13. A cell according to claim 9, in which the electrochemically active substance comprises an electropositive substance selected from members of the group of substances consisting in lithium, sodium, potassium, magnesium and calcium, or an alloy or composition containing any such member.

14. A cell according to claim 13, in which the electropositive substance comprises sodium.

15. A cell according to claim 13, in which the electropositive substance comprises an alloy or a composition with aluminium, silicon or boron.

16. A cell according to claim 9, in which the electrochemically active substance comprises an electronegative substance selected from the group of substances consisting in the halogens.

17. A cell according to claim 1, in which at least one of the electrodes has an electrochemically active scavenger body electronically connected thereto for scavenging free electrochemical reaction products formed during use in the cell, the active scavenger body comprising a body of dehydrated zeolite crystals treated with an electron conductive material to make the active scavenger body electron conductive.

18. A cell according to claim 17, in which the electrode is housed within the active scavenger body.

19. A cell according to claim 1, in which the electrolyte is liquid at the operating temperature of the cell.

20. A cell according to claim 19, in which the electrolyte comprises a multiple salt mixture of alkali metal and/or alkaline earth metal halide salts.

21. A cell according to claim 1, in which the electrolyte comprises an alkali metal halide-aluminium halide mixture.

22. A composite electrode for an electrochemical cell, the composite electrode comprising an electrochemically active electrode and an active scavenger body electronically connected to the electrode for scavenging free electrochemical reaction products formed during use in a cell, the active scavenger body comprising a body of dehydrated zeolite crystals treated with an electron conductive material to make the active scavenger body electron conductive.

23. A composite electrode according to claim 22, in which the electrode is housed within the active scavenger body.

24. An electrochemical cell comprising a pair of compatible electrodes and an electrolyte, at least one of the electrodes being in the form of a composite electrode comprising an electrochemically active electrode and an active scavenger body electronically connected to the electrode for scavenging free electrochemical reaction products formed during use in the cell, the active scavenger body comprising a body of dehydrated zeolite crystals treated with an electron conductive material to make the active scavenger body electron conductive.

25. A cell according to claim 1 in which said element is present in the form of a composition thereof with carbon, silicon, boron or nitrogen.

26. An electrochemicall cell including a pair of compatible electrodes and a compatible electrolyte, at least one of the electrodes comprising an electrochemically active substance which comprises a composition containing oxygen, sulphur or selenium, with the proviso that elemental sulphur; elemental selenium; elemental sulphur stabilized by having its vapour pressure lowered by its containing a minor proportion in relation to the sulphur of a stabilizing electronegative element comprising selenium, arsenic, phosphorous or antimony; and elemental selenium stabilized by having its vapour pressure lowered by its containing a minor proportion in relation to the selenium of a stabilizing electronegative element comprising sulphur, arsenic, phosphorous or antimony, are excluded, so that such sulphur and selenium in elemental or stabilized form are excluded as electrochemically active substances, and a zeolite molecular sieve carrier having pore sizes of less than 100 Angstrom units wherein the electrochemically active substance is sorbed and is held in dispersed form in the cavities thereof for effective use in the cell.

27. A cell according to claim 26 in which said composition is a composition with carbon, boron, silicon or nitrogen.

28. A cell according to claim 26, in which the zeolite molecular sieve carrier comprises dehydrated natural or synthetic zeolite crystals.

29. A cell according to claim 28, in which the zeolite crystals are selected from the group consisting in faujasite, erionite, zeolite 3A, zeolite 4A, zeolite 5A and zeolite 13X.

30. A cell according to claim 28, in which the zeolite molecular sieve carrier has graphite in admixture therewith to provide effective electron conductivity through the electrode.

31. A cell according to claim 28, in which the electron conductivity of the electrode is enhanced by an electrochemically inert current collector impregnated into some of the carrier cavities.

32. A cell according to claim 26, in which at least one of the electrodes has an electrochemically active scavenger body electronically connected thereto for scavenging free electrochemical reaction products formed during use in the cell, the active scavenger body comprising a body of dehydrated zeolite crystals treated with an electron conductive material to make the active scavenger body electron conductive.

33. A cell according to claim 32, in which the electrode is housed within the active scavenger body.

34. A cell according to claim 26, in which the electrolyte is liquid at the operating temperature of the cell.

35. A cell according to claim 34, in which the electrolyte comprises a multiple salt mixture of alkali metal and/or alkaline earth metal halide salts.

* * * * *

UNITED STATES PATENT AND TRADEMARK OFFICE
CERTIFICATE OF CORRECTION

PATENT NO. : 4,287,268
DATED : September 1, 1981
INVENTOR(S) : Johan Coetzer

It is certified that error appears in the above-identified patent and that said Letters Patent are hereby corrected as shown below:

In Column 13, line 46, please delete "If" and insert --In--.

In Column 15, Table I, in Column 4, after "Ze-4A" insert --Fe--.

Signed and Sealed this

Thirtieth Day of March 1982

[SEAL]

Attest:

Attesting Officer

GERALD J. MOSSINGHOFF
Commissioner of Patents and Trademarks